United States Patent
Tsuji et al.

[11] Patent Number: 5,289,282
[45] Date of Patent: Feb. 22, 1994

[54] VIDEO SIGNAL GRADATION CORRECTOR

[75] Inventors: Toshiaki Tsuji, Takatsuki; Atsuhisa Kageyama, Ibaraki; Kiyoshi Imai, Kyoto, all of Japan

[73] Assignee: Matsushita Electric Industrial Co., Ltd., Osaka, Japan

[21] Appl. No.: 886,801

[22] Filed: May 22, 1992

[30] Foreign Application Priority Data
May 28, 1991 [JP] Japan .................. 3-123647
May 28, 1991 [JP] Japan .................. 3-123648

[51] Int. Cl.⁵ .................................. H04N 5/14
[52] U.S. Cl. ........................ 348/624; 348/607
[58] Field of Search ............. 358/160, 37, 166, 455, 358/167, 36, 168, 169; 382/18

[56] References Cited
U.S. PATENT DOCUMENTS
4,695,884  9/1987  Anastassiou et al. .......... 358/163

FOREIGN PATENT DOCUMENTS
0274281  11/1988  Japan ....................... H04N 7/13
3-126377  5/1991  Japan .

Primary Examiner—Victor R. Kostak
Attorney, Agent, or Firm—Stevens, Davis, Miller & Mosher

[57] ABSTRACT

A video signal gradation corrector used in a television receiver or the like for preventing the destruction of the gradation of the black side and the floating of the luminance level of the black side and/or an excessive increase of the luminance level of the white side. The corrector can be realized with a small circuit scale. A histogram operating circuit includes an average luminance level detecting circuit. A constant is subtracted from an output signal of the average luminance level detecting circuit by a subtracter. The result of subtraction is multiplied by a constant by a constant-multiplication circuit. A lower-limit limiter circuit limits an output signal of the constant-multiplication circuit to a signal having a value not smaller than 0. An output signal of the lower-limit limiter circuit is provided as an accumulation start luminance level, thereby enabling a gradation correction in which the floating of the luminance level of the black side and the destruction of the gradation of the black side are prevented.

6 Claims, 6 Drawing Sheets

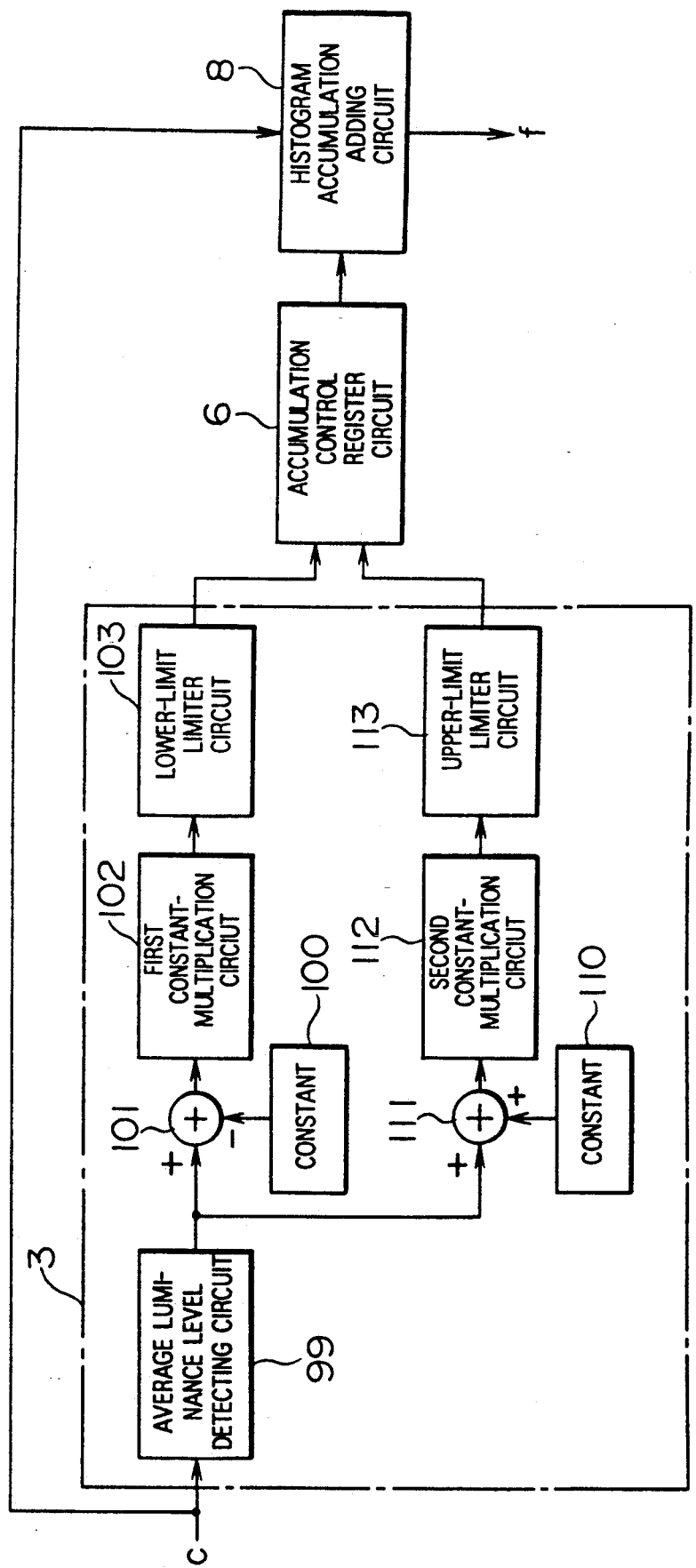

VIDEO SIGNAL GRADATION CORRECTOR

BACKGROUND OF THE INVENTION

The present invention relates to a gradation corrector used in correcting the gradation of a video signal in a television receiver, a video tape recorder, a video camera, a video disk or the like.

In recent years, great importance has been attached to gradation correctors in order to provide a more clear image, which is required with the increase in size of color television receivers and the improvement in image quality thereof, and more especially, in order to expand the dynamic range of an image on a CRT by passing a video signal through a non-linear amplifier to correct the gradation of the video signal.

U.S. Pat. application Ser. No. 838,844 entitled "Gradation corrector" was filed on Feb. 21, 1992 (on basis of Japanese application No. 3-32792 filed on Feb. 2, 1991). U.S. Pat. application Ser. No. 846,143 entitled "video signal gradation corrector" was filed on Mar. 5, 1992 (on basis of Japanese patent application Ser. No. 3-58657 filed on Mar. 22, 1991). A new U.S. Pat. application entitled "Gradation corrector" is filed on basis of Japanese patent application Ser. No. 3-123646 filed on May 28, 1991. These three patent applications have been assigned to the same assignee with the present application.

Explanation will now be made of the conventional gradation corrector.

FIG. 5 shows a block diagram of a gradation corrector proposed precedent to the present application. In FIG. 5, reference numeral 1 designates an A/D conversion circuit for converting an input luminance signal into a digital value. Numeral 2 designates a histogram memory for extracting a luminance histogram of the input luminance signal. In general, the luminance level is entered as an address of the memory 2 and the frequency is entered as data thereof. Numeral 3 designates a histogram operating circuit for determining the average value, the mode value, the minimum value, the maximum value, the deviation coefficient, the white area, the black area, etc. of the input luminance signal from the data of histogram memory 2 and calculates control values inclusive of a limiter level, the value of addition, a constant value of addition, an accumulation start luminance level, an accumulation stop luminance level, the maximum luminance level and so on from the determined values to output the control values to a limiter/adder circuit 5, an accumulation control register circuit 6 and a normalization control register 7. The limiter/adder circuit 5 is provided for processing the data of the histogram memory 2. Namely, on the basis of data transferred from the histogram operating circuit 3, the limiter/adder circuit 5 imposes a limitation on the frequency of the histogram so that it does not exceed a certain level and performs the operation of addition of a certain value. Generally, in a period of time when the luminance histogram is extracted (or in a period of time when the sampling is made), the data processing performed by the limiter/ adder circuit 5 is completed during a time when the address is accessed once. The accumulation start and stop levels, at which the accumulation is to be started and stopped in determining a cumulative histogram, are supplied from the histogram operating circuit 3 to the accumulation control register 6 which in turn controls a histogram accumulation adding circuit 8.

The histogram accumulation adding circuit 8 makes the accumulation of processed data from the histogram memory 2 on the basis of a control signal from the accumulation control register circuit 6. Numeral 9 designates a cumulative histogram memory for storing therein the result of accumulation by the histogram accumulation adding circuit 8. In general, the luminance level enters an address of the memory 9 and the frequency enters as data thereof. In normalizing data of the cumulative histogram to produce a look-up table, the maximum luminance level for an output luminance signal after normalization is supplied from the histogram operating circuit 3 to the normalization control register circuit 7 and the normalization control register circuit 7 controls a normalization coefficient used by a look-up table operating circuit 10 in accordance with the value of the maximum luminance level. The look-up table operating circuit 10 normalizes each data of the cumulative histogram memory 9 on the basis of an output signal of the normalization control register circuit 7. Numeral 11 designates a look-up table memory for storing therein the data normalized by the look-up table operating circuit 10. In general, the luminance level is entered as an address of the memory 11 and the frequency is entered as data thereof. Numeral 12 designates a timing control circuit 12 which makes or controls the sequence of various operations, the control for the memories, and so on. Numeral 13 designates a D/A conversion circuit by which a digital output signal corrected by use of the look-up table is converted into an analog signal.

Next, explanation will be made of the operation of the gradation corrector having the above construction. FIGS. 6A to 6F show operating waveforms of various parts.

First, an input luminance signal a is inputted to the A/D conversion circuit 1 and is converted thereby into a digital signal which is in turn outputted as a converted input luminance signal b. The converted input luminance signal b is taken as an address of the histogram memory 2 and data at that address is processed by the limiter/adder circuit 5. By performing this operation during one vertical scanning period, it is possible to extract a luminance histogram of the input luminance signal a. This situation is shown in FIG. 6A.

Next, data of the histogram memory 2 including the luminance histogram is read by the histogram operating circuit 3 which in turn calculates the average value, the mode value, the minimum value, the maximum value, the deviation coefficient, the white area, the black area, etc. of the input luminance signal a. The histogram operating circuit 3 determines control values inclusive of a limiter level, a constant value of addition, an accumulation calculation start luminance level, an accumulation calculation stop luminance level, the maximum luminance level after normalization and so on from the result of the above calculation and transfers these control signals e to the limiter/adder circuit 5, the accumulation control register circuit 6 and the normalization control register circuit 7.

Thereafter, the limiter/adder circuit 5 reads data from the histogram memory 2 to make a limiter (see FIG. 6B) and the operation of addition of a constant value (see FIG. 6C) or the like for each read data on the basis of each control signal transferred from the histogram operating circuit 3 and outputs the result to the histogram accumulation adding circuit 8 as corrected histogram data c. A curve obtained by the cumulative addition becomes closer to a linear profile as the constant value of addition is increased and approaches to a histogram flatting process as the constant value of addition is decreased (see FIG. 6D).

On the basis of the accumulation start luminance level and the accumulation stop luminance level supplied from the accumulation control register circuit 6, the histogram accumulation adding circuit 8 calculates cumulative histogram data f of the corrected histogram data c in a range between accumulation start and stop luminance levels and causes the cumulative histogram memory 9 to store the result of calculation. This situation is shown in FIGS. 6C and 6D.

Next, the look-up table operating circuit 10 reads the cumulative histogram data from the cumulative histogram memory 9 to determine a normalization coefficient so that the maximum value of the cumulative histogram data becomes the maximum output luminance level h supplied from the normalization control register circuit 7. The look-up table operating circuit 10 performs an operation on each data g of the cumulative histogram on the basis of the determined normalization coefficient and causes the look-up table memory 11 to store the result i. If the maximum output luminance level h is controlled, an operation such as an automatic contrast control (ACL) or an automatic brightness control (ABL) is possible. Such an operation is shown in FIG. 6E.

Thereafter, data in the look-up table memory 11 is read with the converted input luminance signal b being used as an address and the read data is outputted as a corrected output luminance signal j. FIG. 6F shows a histogram of the corrected output luminance signal. The D/A conversion circuit 13 outputs the corrected output luminance signal j after conversion thereof into an analog signal k.

The timing control circuit 12 controls the operations of various circuits so that the operations of the respective parts are performed at such a sequence as mentioned above. [For example, refer to Japanese Patent Application No. (Hei)1-265393, entitled "Gradation Corrector", filed on Oct. 12, 1989 (JP-A-3-126377 dated May 29, 1991)].

However, in the above construction of the precedent corrector, since the accumulation start luminance level and the accumulation stop luminance level, which are to be controlled in determining the cumulative histogram, are not controlled in accordance with an average luminance level of an input video signal, there is a first problem that by hot depending on the average luminance level of the input video signal, the gradation of the black side is destroyed, the luminance level of the black side floats or the luminance level of the white side becomes too high so that a beam current of a CRT increases, thereby causing the blooming of the CRT.

Also, the construction of the preceding corrector has a second problem that the capacity of the look-up table memory (or the number of bits required for one address) becomes large.

SUMMARY OF THE INVENTION

A first object of the present invention is to solve the above-mentioned first problem of the prior art or to provide a gradation corrector in which the insurance of the gradation of the black side, and the suppression of the floating of the luminance level of the black side and/or the suppression of excessive increase of the luminance level of the white side are made for any average luminance level.

A second object of the present invention is to solve the above-mentioned second problem of the prior art or to reduce the capacity required for a look-up memory, thereby providing a gradation corrector which can be realized with a small circuit scale.

To attain the first object, the present invention provides a gradation corrector comprising a histogram memory, a histogram operating circuit, a limiter/adder circuit, an accumulation control register circuit, a normalization control register circuit, a histogram accumulation adding circuit, a cumulative histogram memory, a look-up table operating circuit, a look-up table memory and a timing control circuit, in which the histogram operating circuit includes a constant, a circuit for detecting an average luminance level of an input luminance signal, a subtracter for subtracting the constant from the average luminance level detected, and lower-limit limiter circuit for limiting an output signal of the subtracter to a signal which has a value not smaller than 0.

With the above construction, an accumulation start luminance level, which is one of control signals used in determining a cumulative histogram, is made variable in accordance with the average luminance level of the input signal, thereby enabling the insurance of a gradation on the black side and the suppression of the floating of the luminance level of the black side for an input video signal of any average luminance level.

Alternatively, the histogram operating circuit may include a constant, a circuit for detecting an average luminance level of an input luminance signal, an adder for adding the average luminance level detected and the constant, and an upper-limit limiter circuit for limiting an output signal of the adder to a certain upper limit value.

With this construction, an accumulation stop luminance level, which is one of control signals used in determining a cumulative histogram, is made variable in accordance with the average luminance level of the input signal, thereby enabling the suppression of excessive increase of the luminance level of the white side to prevent the blooming of a CRT.

Alternatively, the histogram operating circuit may include a constant, a circuit for detecting an average luminance level of an input luminance signal, a subtracter for subtracting the constant from the average luminance level detected, a constant-multiplication circuit for multiplying an output signal of the subtracter by a constant, and a lower-limit limiter circuit for limiting an output signal of the constant-multiplication circuit to a signal which has a value not smaller than 0.

With this construction, the constant which determines a changing point of the accumulation start luminance level changed in accordance with the average luminance level of the input signal and/or a coefficient by which the multiplication is made by the constant-multiplication circuit, are made variable in accordance with the characteristic of a display device such as a CRT or the characteristic of a driving circuit of the display device, thereby enabling a more optimal gradation correction of the luminance level of the black side.

Alternatively, the histogram operating circuit may include a constant, a circuit for detecting an average luminance level of an input luminance signal, an adder for adding the average luminance level detected and the constant, a constant-multiplication circuit for multiplying an output signal of the adder by a constant, and an upper-limit limiter circuit for limiting an output signal of the constant-multiplication circuit to a certain upper limit value.

With this construction, the constant which determines a changing point of the accumulation stop luminance level changed in accordance with the average luminance level of the input signal and/or a coefficient by which the multiplication is made by the constant-multiplication circuit, are made variable in accordance with the characteristic of a display device such as a CRT or the characteristic of a driving circuit of the display device, thereby enabling a more optimal gradation correction of the luminance level of the white side.

To attain the second object, the present invention provides a gradation corrector comprising a histogram memory for storing a luminance histogram of a video luminance signal, a histogram operating circuit connected to the output side of the histogram memory, a limiter/adder circuit, an accumulation control register circuit and a normalization control register circuit each connected to the output side of the histogram operating circuit, a histogram accumulation adding circuit to which an output of the histogram memory and an output of the accumulation control register circuit are connected, a cumulative histogram memory for storing the result of cumulative addition made by the histogram accumulation adding circuit, a look-up table operating circuit to which an output of the cumulative histogram memory and an output of the normalization control register circuit are connected, a subtracter for subtracting an output signal of a timing control circuit from an output signal of the look-up table operating circuit, a look-up table memory for storing the result of subtraction, an adder for adding a look-up table memory and an input signal of the video luminance signal, and the timing control circuit.

With the above construction, data of the respective addresses of the cumulative histogram memory are successively read and are normalized by the look-up table operating circuit. From the result of an operation performed by the look-up table operating circuit is subtracted an address of the cumulative histogram memory at that time and a difference obtained by the subtraction is stored into the look-up table memory. The inputted luminance signal and an output signal of the look-up table memory corresponding thereto are added to obtain a corrected output luminance signal. Thereby, it is possible to make reduce the capacity of the look-up table memory.

BRIEF DESCRIPTION OF THE DRAWINGS

FIG. 1 is a block diagram of a main part of a gradation corrector according to a first embodiment of the present invention;

DESCRIPTION OF THE PREFERRED EMBODIMENTS

A first embodiment of the present invention will now be explained in reference to FIGS. 1 and 2A to 2D.

Figure 5:
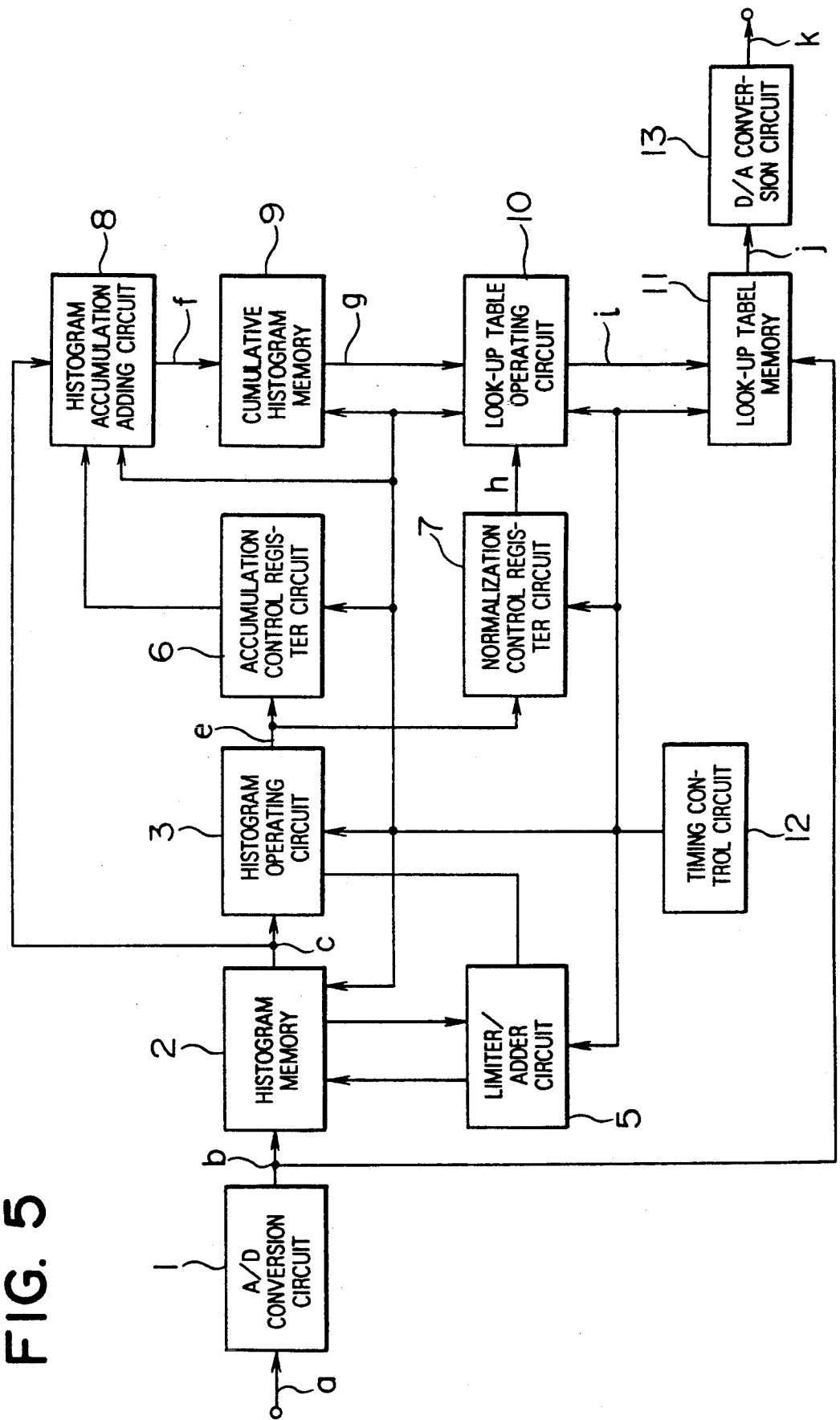
FIG. 5 is a block diagram of the preceding gradation corrector.
Figure 6A:
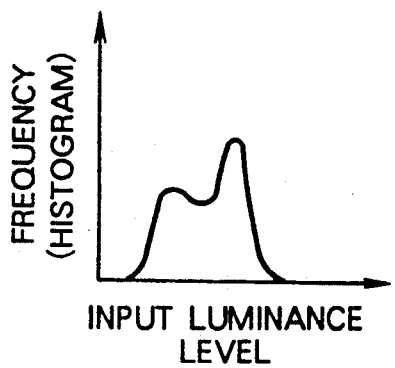
FIGS. 6A to 6F show waveforms for explaining the operation of the preceding gradation corrector.
Figure 6B:
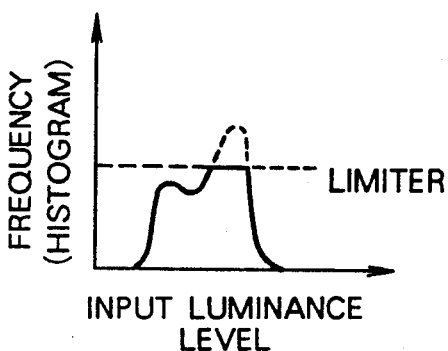
Figure 6C:
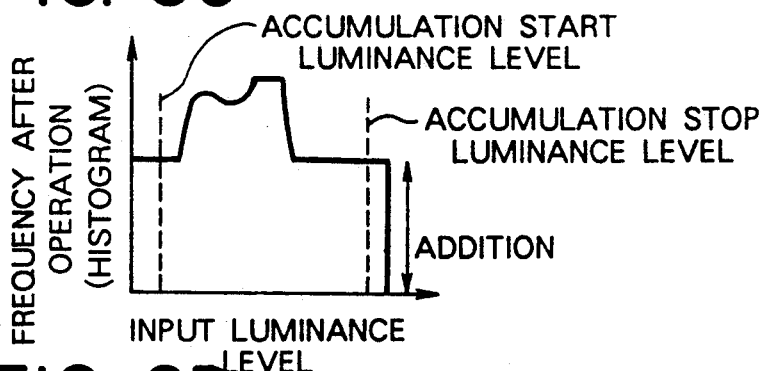
Figure 6D:
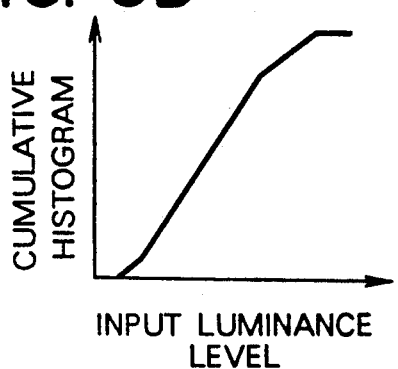
Figure 6E:
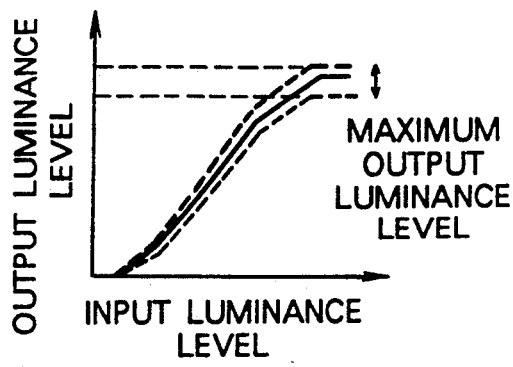
Figure 6F:
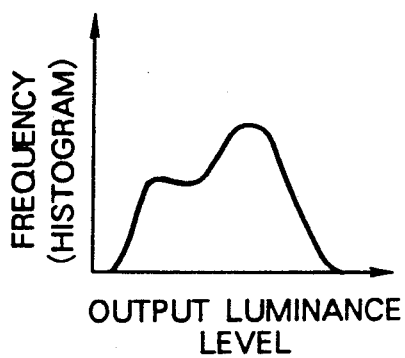

FIG. 1 is a block diagram of a main part of a gradation corrector according to the first embodiment of the present invention. In FIG. 1, reference numerals 6 and 8 designate an accumulation control register circuit and a histogram accumulation adding circuit which are the same as those used in the conventional gradation corrector shown in FIG. 5. Numeral 99 designates an average luminance level detecting circuit which detects an average luminance level of an input luminance signal. Numeral 101 designates a subtracter which subtracts a certain constant 100 from an output signal of the average luminance level detecting circuit 99. Numeral 102 designates a first constant-multiplication circuit which multiplies an output signal of the subtracter 101 by a constant. Numeral 103 designates a lower-limit limiter circuit which makes a limitation so that a signal outputted from the first constant-multiplication circuit 102 becomes a signal having a value not smaller than 0. Numeral 111 designates an adder which adds the output signal of the average luminance level detecting circuit 99 and a constant 110. Numeral 113 designates an upper-limit limiter circuit which makes a limitation so that an output signal of the adder 111 does not exceed a certain value.

The operation of the gradation corrector having the above construction will now be explained. First, an average luminance level (hereinafter referred to as APL i.e. average picture level) of an input luminance signal is detected by the average luminance level detecting circuit 99. Next, the certain constant 100 is subtracted from the detected APL by the subtracter 101 and the result of subtraction is multiplied by a certain coefficient by the first constant-multiplication circuit 102. An output signal of the first constant-multiplication circuit 102 is supplied to the lower-limit limiter circuit 103 which in turn outputs a signal having a value not smaller than 0 in such a manner that a signal having a negative value as the result of multiplication is fixed to 0. An output signal of the lower-limit limiter circuit 103 is supplied to the accumulation control register circuit 6 as an accumulation start luminance level which is to be used in determining a cumulative histogram.

Figure 2A:
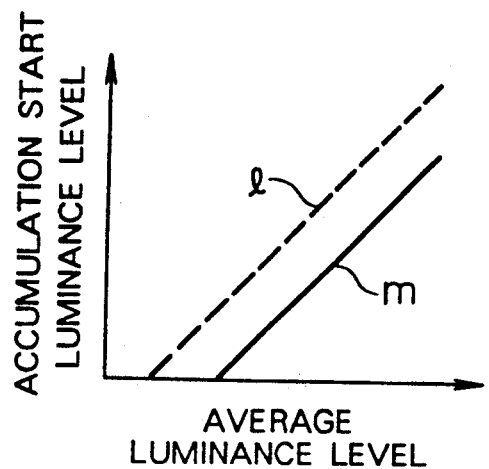
FIGS. 2A to 2D show characteristic curves for explaining the outline of the operation of the first embodiment of the present invention.
Figure 2B:
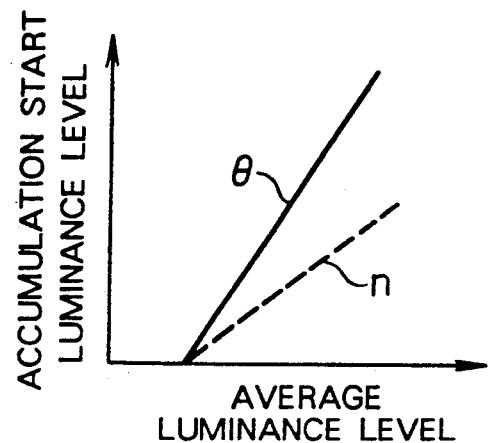

Characteristic curves of the accumulation start luminance level in that case are shown in FIGS. 2A and 2B. FIG. 2A shows characteristic curves of the accumulation start luminance level when the value of the constant 100 is changed. In the figure, a curve l corresponds to the case where the value of the constant 100 is made small, and a curve m corresponds to the case where the value of the constant 100 is made large. FIG. 2B shows characteristic curves of the accumulation start luminance level when the coefficient of the first constant-multiplication circuit 102 is changed. In the figure, a curve n corresponds to the case where the value of the coefficient is made small, and a curve $\theta$ corresponds to the case where the value of the coefficient is made large. Thus, when the APL is high, the accumulation start luminance level is made large, thereby suppressing the floating of the luminance level of the black side. On the other hand, when the APL is low, the accumulation start luminance level is made small thereby preventing the gradation of the black side from being destroyed. Further, by making the value of the constant 100 and/or the coefficient of the first constant-multiplication circuit 102 variable in accordance with the characteristic of a display device such as a CRT or the characteristic of a driving circuit of the display device, it is possible to make a more optimal gradation correction for the black side.

Also, in FIG. 1, the detected APL and the certain constant 110 are added by the adder 111 and the result of addition is multiplied by a certain coefficient by a second constant-multiplication circuit 112. The upper-limit limiter circuit 113 makes a limitation for an output signal of the second constant-multiplication circuit 112 in such a manner that when the output signal exceeds a certain value, the signal is fixed to the certain value or the maximum value. An output signal of the upper-limit limiter circuit 113 is supplied to the accumulation control register circuit 6 as an accumulation stop luminance level which is to be used in determining a cumulative histogram.

Figure 2C:
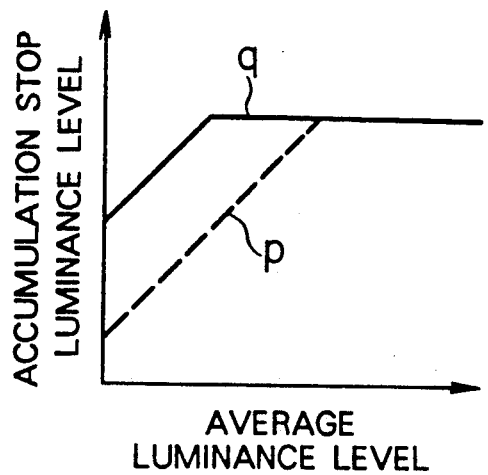
Figure 2D:
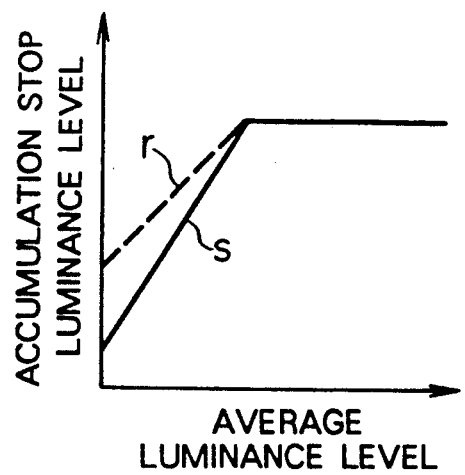

Characteristic curves of the accumulation stop luminance level in that case are shown in FIGS. 2C and 2D. FIG. 2C shows characteristic curves of the accumulation stop luminance level when the value of the constant 110 is changed. In the figure, a curve p corresponds to the case where the value of the constant 110 is made small, and a curve q corresponds to the case where the value of the constant 110 is made large. FIG. 2D shows characteristic curves when the coefficient of the second constant-multiplication circuit 112 is changed. In the figure, a curve r corresponds to the case where the value of the coefficient is made small, and a curve s corresponds to the case where the value of the coefficient is made large. Thus, as the APL becomes higher, the accumulation stop luminance level is made larger, thereby suppressing an excessive increase of the luminance level of the white side to prevent the blooming of a CRT. Further, by making the value of the constant 110 and/or the coefficient of the second constant-multiplication circuit 112 variable in accordance with the characteristic of a display device such as a CRT or the characteristic of a driving circuit of the display device, it is possible to make a more optimal gradation correction for the white side.

According to the present embodiment as described above, the average luminance level detecting circuit 99, the constant 100, the subtracter 101, the first constant-multiplication circuit 102, the lower-limit limier circuit 103, the constant 110, the adder 111, the second constant-multiplication circuit 112 and the upper-limit limiter circuit 113 are provided, thereby enabling a gradation correction in which the insurance of the gradation of the black side and the suppression of the floating of the luminance level of the black side are made for an input video signal having any average luminance level. Further, it is possible to make a gradation correction in which an excessive increase of the luminance level of the white side is suppressed. Also, by making the values of the constants and the values of multiplication coefficients of the constant-multiplication circuits variable in accordance with the characteristic of a display device such as a CRT or the characteristic of a driving circuit of the display device, it is possible to make a more optimal gradation correction.

Next, a second embodiment of the present invention will be explained in reference to FIGS. 3, 4A and 4B.

Figure 3:
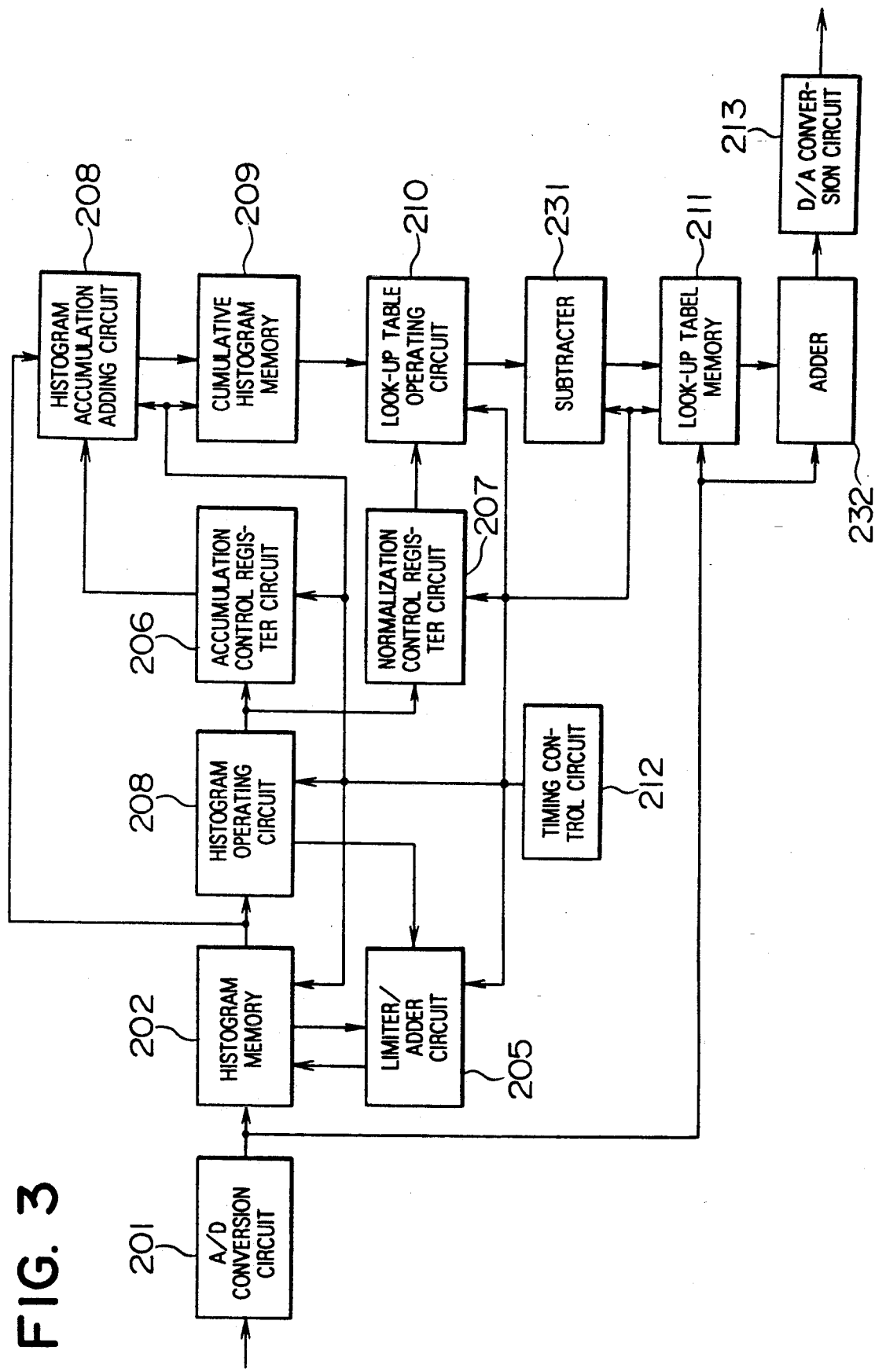
FIG. 3 is a block diagram of a gradation corrector according to a second embodiment of the present invention.
Figure 4A:
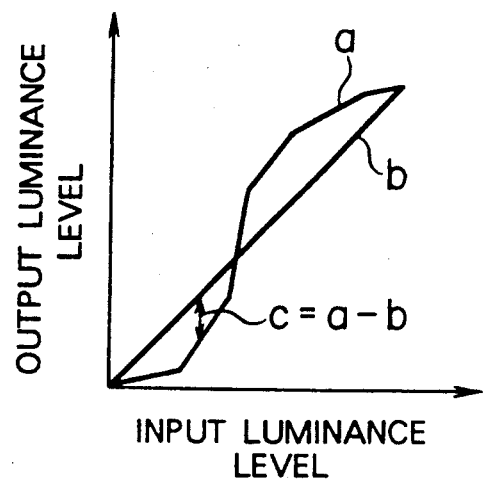
FIGS. 4A and 4B show waveforms for explaining the second embodiment of the present invention.
Figure 4B:
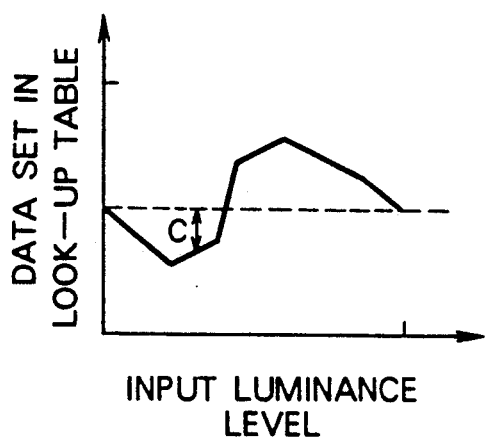

In FIG. 3 showing a block diagram of a gradation corrector according to the second embodiment of the present invention, reference numerals 209, 210 and 211 designate a cumulative histogram memory, a look-up table operating circuit and a look-up table memory which are the same as those used in the conventional gradation corrector. Numeral 231 designates a subtracter which subtracts an output of a timing control circuit 212 from an output of the look-up table operating circuit 210, and numeral 232 designates an adder which adds an output of the look-up table memory 211 and an input video signal.

The operation of the gradation corrector having the above construction will now be explained in reference to FIGS. 4A and 4B. First, data of the respective addresses of the cumulative histogram memory 209 are successively read and are normalized by the look-up table operating circuit 210. Next, from an output signal of the look-up table operating circuit 210 (see a in FIG. 4A) is subtracted an address of the cumulative histogram memory 209 at that time (see b in FIG. 4A) and the result of this operation (see c in FIG. 4A) is stored into the look-up table memory 211. FIG. 4B shows data stored in the look-up table memory 211. On the basis of a video luminance signal inputted is read data of the look-up table memory 211 which corresponds to the input video luminance signal. The output signal of the look-up table memory 211 and the input video luminance signal are added by the adder 232. Thus, a corrected output luminance signal is produced.

According to the present embodiment as described above, the subtracter 231 and the adder 232 are provided, thereby making it possible to reduce the amount of data to be stored in the look-up table memory 231 (or the number of bits for one address).

As apparent from the foregoing, the present invention provides a gradation corrector comprising a histogram memory, a histogram operating circuit, a limiter-/adder circuit, an accumulation control register circuit, a normalization control register circuit, a histogram accumulation adding circuit, a cumulative histogram memory, a look-up table operating circuit, a look-up table memory and a timing control circuit, in which the histogram operating circuit includes a constant, a circuit for detecting an average luminance level of an input luminance signal, a subtracter for subtracting the constant from the average luminance level detected, and a lower-limit limiter circuit for limiting an output signal of the subtracter to a signal which has a value not smaller than 0, thereby making it possible to realize a gradation corrector which enables the insurance of the gradation of the black side and the suppression of the floating of the luminance level of the black side for an input video signal having any average luminance level.

Alternatively, the histogram operating circuit may include a constant, an average luminance level detecting circuit, an adder for adding the average luminance level and the constant, and an upper-limit limiter circuit for limiting an output signal of the adder to a certain upper limit value, thereby making it possible to realize a gradation corrector which can suppress an excessive increase of the luminance level of the white side to prevent the blooming of a CRT.

Alternatively, the histogram operating circuit may include a constant, an average luminance level detecting circuit, a subtracter for subtracting the constant from the average luminance level, a constant- o multiplication circuit for multiplying an output signal of the subtracter by a constant, and a lower-limit limiter circuit for limiting an output signal of the constant-multiplication circuit to a signal which has a value not smaller than 0, in which the constant and/or the multiplication coefficient of the constant-multiplication circuit are made variable in accordance with the characteristic of a display device such as a CRT or the characteristic of a driving circuit of the display device, thereby making it possible to realize a gradation corrector which can make a more optimal gradation correction of the luminance level of the black side.

Alternatively, the histogram operating circuit may include a constant, an average luminance level detecting circuit, an adder for adding the average luminance level and the constant, a constant-multiplication circuit for multiplying an output signal of the adder by a constant, and an upper-limit limiter circuit for limiting an output signal of the constant-multiplication circuit to a certain upper limit value, in which the constant and/or the multiplication coefficient of the constant-multiplication circuit are made variable in accordance with the characteristic of a display device such as a CRT or the characteristic of a driving circuit of the display device, thereby making it possible to realize a gradation corrector which can make a more optimal gradation correction of the luminance level of the white side.

Also, the present invention provides a gradation corrector comprising a histogram memory, a histogram operating circuit, a limiter/adder circuit, an accumulation control register circuit, a normalization control register circuit, a histogram accumulation adding circuit, a cumulative histogram memory, a look-up table operating circuit, a subtracter, a look-up table memory, an adder and a timing control circuit, whereby a storage capacity of the look-up table memory required can be reduced, thereby making it possible to realize a gradation corrector with a small circuit scale.

What is claimed is:

1. A video signal gradation corrector comprising:
    a histogram memory for storing a luminance histogram of a video luminance signal;
    a histogram operating circuit, receiving an output signal of said histogram memory, for extracting a feature of the luminance histogram from the output signal;
    a limiter/adder circuit, connected to an output side of said histogram operating circuit, for processing data of said histogram memory;
    an accumulation control register circuit connected to the output side of said histogram operating circuit;
    a normalization control register circuit connected to the output side of said histogram operating circuit;
    a histogram accumulation adding circuit, receiving an output signal of said histogram memory and an output signal of said accumulation control register circuit, for calculating a cumulative sum of said processed data of said histogram memory;
    a cumulative histogram memory for storing said cumulative sum;
    a look-up table operating circuit, receiving an output signal of said cumulative histogram memory and an output signal of said normalization data of said cumulative histogram memory; and
    a loop-up table memory for storing a result of said normalization performed by said look-up table operating circuit;
    wherein said histogram operating circuit includes a circuit for detecting an average luminance level of an input luminance signal, operator means for performing an operation on the detected average luminance level using a constant, and a limiter circuit for limiting a lower limit value or an upper limit value of an output signal of said means.

2. A video signal gradation corrector according to claim 1, wherein said operator means of said histogram operating circuit includes a subtractor for subtracting said constant from the detected average luminance level, and
    said limiter circuit of said histogram operating circuit includes a lower-limit limiter circuit for limiting an output signal of said subtractor to a signal having a value not smaller than zero.

3. A video signal gradation corrector according to claim 1, wherein said operator means of said histogram operating circuit includes an adder for adding the detected average luminance level and said constant, and
    said limiter circuit of said histogram operating circuit includes an upper-limit limiter circuit for limiting an output signal of said adder to a certain upper limit value.

4. A video signal gradation corrector according to claim 1, wherein said operator means of said histogram operating circuit includes a subtractor for subtracting said constant from the detected average luminance level, said histogram operating circuit further comprises a constant-multiplication circuit for multiplying an output signal of said subtracter by a constant and said limiter circuit of said histogram operating circuit includes a lower-limit limiter circuit for limiting an output signal of said constant-multiplication circuit to a signal having a value not smaller than zero.

5. A video signal gradation corrector according to claim 1, wherein said operator means of said histogram operating circuit includes an adder for adding the detected average luminance level and said constant, 6. A video signal gradation corrector comprising:
    a histogram memory for storing a luminance histogram of video luminance signal;
    a histogram operating circuit, receiving an output signal of said histogram memory, for extracting a feature of the luminance histogram from the output signal;
    a limiter/adder circuit, connected to an output side of said histogram operating circuit, for processing data of said histogram;
    an accumulation control register circuit connected to the output side of said histogram operating circuit;
    a normalization control register circuit connected to the output side of said histogram operating circuit;
    a histogram accumulation adding circuit, receiving an output signal of said histogram memory and an output signal of said accumulation control register circuit, for calculating a cumulative sum of said processed data of said histogram;
    a cumulative histogram memory for storing said cumulative sum;
    a look-up table operating circuit, receiving an output signal of said cumulative histogram memory and an output signal of said normalization control register circuit, for normalizing data of said cumulative histogram memory;
    a subtractor, connected to an output side of said look-up table operating circuit, for subtracting a current address of said cumulative histogram memory from an output signal successively provided from said look-up table operating circuit;
    a look-up table memory for storing a result of said subtraction;
    an adder for adding an output signal of said look-up table memory and an inputted video luminance signal; and
    a timing control circuit for controlling operations of the video signal gradation corrector.
    * * * * *

UNITED STATES PATENT AND TRADEMARK OFFICE
CERTIFICATE OF CORRECTION

PATENT NO. : 5,289,282
DATED : February 22, 1994
INVENTOR(S) : Toshiaki TSUJI et al It is certified that error appears in the above-indentified patent and that said Letters Patent is hereby corrected as shown below:

Column 10, line 31, after "constant," insert --said histogram operating circuit further comprises a constant-multiplication circuit for multiplying an output signal of said adder by a constant, and said limiter circuit of said histogram operating circuit includes an upper-limit limiter circuit for limiting an output signal of said constant-multiplication circuit to a certain upper limit value.--

Signed and Sealed this

Twentieth Day of June, 1995

Attest:

BRUCE LEHMAN

Attesting Officer    Commissioner of Patents and Trademarks